No. 860,116. PATENTED JULY 16, 1907.
H. A. BALCOME.
MOTOR CLUTCH.
APPLICATION FILED MAR. 1. 1907.
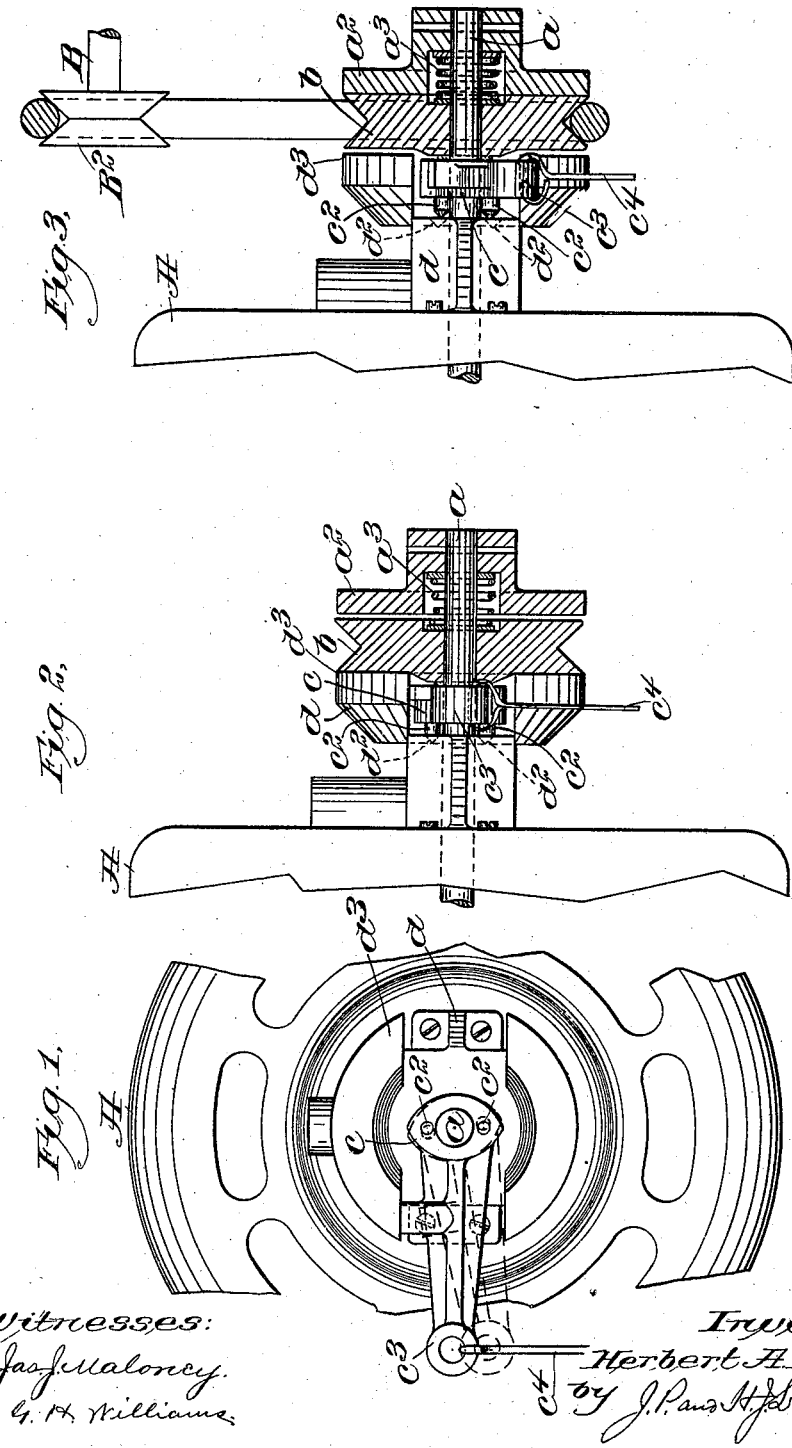

UNITED STATES PATENT OFFICE.

HERBERT A. BALCOME, OF BOSTON, MASSACHUSETTS, ASSIGNOR TO HOLTZER CABOT ELECTRIC COMPANY, A CORPORATION OF MASSACHUSETTS.

MOTOR-CLUTCH.

No. 860,116.　　　　Specification of Letters Patent.　　　　Patented July 16, 1907.

Application filed March 1, 1907. Serial No. 360,056.

*To all whom it may concern:*

Be it known that I, HERBERT A. BALCOME, residing in Boston, in the county of Suffolk and State of Massachusetts, have invented an Improvement in Motor-Clutches, of which the following description, in connection with the accompanying drawings, is a specification, like letters on the drawings representing like parts.

The present invention relates to a motor clutch, and is embodied in a simple clutching device for connecting and disconnecting a motor with the machine driven thereby, the device being especially intended for use with small motors for domestic purposes such as driving sewing machines, and the like.

In accordance with the invention, the motor shaft is provided with a loose pulley longitudinally movable along the shaft and provided with a spring adapted to press the pulley against a stationary member connected with the motor frame, which member constitutes a brake for the loose pulley when not in action. The movement of the pulley in the opposite direction along the shaft against the stress of the spring forces the pulley into frictional contact with a disk rotatably connected with the shaft, so that the pulley will be rotated by the shaft to transmit the movement thereof to the machine to be driven. To produce the longitudinal movement of the pulley against the stress of the spring, a cam member is pivotally supported upon the shaft so as to be rocked thereon, the said member coöperating in its rocking movement with a stationary cam surface formed in a part of the frame surrounding the shaft, so that by rocking the cam member it is moved longitudinally, such movement being transmitted to the pulley. The cam member may conveniently be connected with a treadle, and the speed of the driven machine can be controlled, to a certain extent, by varying the pressure so as to admit of more or less slip between the shaft and pulley.

Figure 1 is an end elevation of a motor provided with a clutch embodying the invention; Fig. 2 is a view, partly in elevation and partly in longitudinal section, taken on a plane at right angles to Fig. 1; and Fig. 3 is a similar view showing the pulley shifted to the opposite position.

The motor A, which may be of any suitable or usual type, being herein shown as a small electro motor, is provided with the armature shaft $a$ which projects outward through the wall of the motor-frame and is provided with the pulley $b$ to receive a belt for transmission of power to any desired machine, the shaft of such machine being herein indicated by the reference letter B, and provided with the pulley $B^2$.

The pulley $b$ is loosely mounted on the shaft $a$, which is also provided with a friction disk $a^2$ keyed, pinned, or otherwise fastened to the shaft so as to rotate therewith. In order to cause the pulley $b$ to rotate with the shaft, therefore, it is necessary only to force the same into frictional contact with the disk $a^2$, this being accomplished by means of a cam member $c$, which is pivotally supported upon the shaft and capable of longitudinal movement thereon, the said cam member being in engagement with the pulley so as to transmit such longitudinal movement thereto. In the construction shown, the cam member consists of a lug provided with two or more pins $c^2$ having tapered points arranged to enter correspondingly tapered openings $d^2$ in a stationary member $d$ secured to the outer wall of the motor frame and surrounding the shaft $a$. The pulley $b$ is normally pressed away from the friction disk $a^2$ by means of a spring $a^3$, the action of said spring being transmitted through the pulley to the cam member $c$ so as to cause the pins $c^2$ to seek the bottoms of the openings $d^2$ when the cam member is released. In the construction shown, the said cam member is provided with an arm $c^3$ for actuating purposes, said arm being indicated as provided with a link $c^4$ for attachment to a treadle, not herein shown. The frame member $d$ is further provided with a disk $d^3$ against which the pulley $b$ is forced by the spring $a^3$ when the treadle has been released, this surface thus constituting a brake to stop the driven machine promptly upon the release of the treadle.

The rocking of the cam member $c$ from the position shown in Fig. 2 to the position shown in Fig. 3 forces the said cam member to the right carrying with it the pulley which becomes more or less firmly engaged with the rotating disk $a^2$, according to the pressure exerted upon the treadle. The release of the treadle results in the movement of the pulley in the opposite direction through the agency of the spring $a^3$, thus releasing the pulley from the shaft, and at the same time bringing it into contact with the braking surface of the disk $d^3$.

Claims.

1. In a motor clutch, the combination with the driving member; of a member stationary with relation thereto and provided with a cam surface; a cam coöperating with said cam surface, said cam being pivotally supported and longitudinally movable with relation to said driving member; a driven member loosely supported with relation to the driving member; and a friction disk connected with one of said members, the other member being arranged to be forced into frictional engagement therewith by the longitudinal movement of the cam.

2. The combination with the motor shaft; of a stationary member surrounding said shaft and provided with a cam surface and a frictional surface; a pivotally supported cam coöperating with said cam surface; a pulley loosely mounted on said shaft; a spring normally pressing said pulley into engagement with said frictional surface; and a friction disk connected with the shaft, the pulley being arranged to be forced into engagement with said friction disk by said cam against the stress of said spring, substantially as described.

3. The combination with a motor shaft; of a stationary member surrounding said shaft, the said member being provided with a face having tapered openings and with a friction surface; a cam pivotally supported on the shaft and provided with tapered pins to coöperate with the tapered openings; a pulley in engagement with the cam; a spring acting on said pulley to cause the pins to sit in the openings and the pulley to come into engagement with the friction surface; and a friction disk mounted on the shaft to be engaged by the pulley when acted upon by the cam against the action of the spring.

In testimony whereof, I have signed my name to this specification in the presence of two subscribing witnesses.

HERBERT A. BALCOME.

Witnesses:
H. J. LIVERMORE,
W. E. COVENEY.